United States Patent [19]
Tanaka et al.

[11] 4,205,356
[45] May 27, 1980

[54] ERASING HEAD

[75] Inventors: Fumio Tanaka; Naohiko Toshimitsu, both of Chichibu, Japan

[73] Assignees: Canon Kabushiki Kaisha, Tokyo; Canon Denshi Kabushiki Kaisha, Chichibu, both of Japan

[21] Appl. No.: 913,228

[22] Filed: Jun. 6, 1978

[30] Foreign Application Priority Data

Jun. 17, 1977 [JP] Japan .................................. 52-71842

[51] Int. Cl.² .......................... G11B 5/25; G11B 5/27; G11B 5/47
[52] U.S. Cl. ....................................... 360/118; 360/66
[58] Field of Search ................................... 360/118, 66

[56] References Cited

U.S. PATENT DOCUMENTS

| 2,535,712 | 12/1950 | Wolfe | 360/118 |
| 2,673,896 | 3/1954 | Rettinger | 360/118 |
| 3,449,529 | 6/1969 | Camras | 360/118 |
| 3,514,851 | 6/1970 | Perkins et al. | 360/118 |

*Primary Examiner*—Robert S. Tupper
*Attorney, Agent, or Firm*—Fitzpatrick, Cella, Harper & Scinto

[57] ABSTRACT

An erasing head is improved with respect to its erasing ratio as well as its distortion ratio. The erasing head has at least two gap portions one of which is so designed as to apply a high erasing magnetic field sufficient to completely erase information recorded on the tape. The other gap portion is so designed as to apply a magnetic field just intense enough to minimize the distortion ratio.

24 Claims, 11 Drawing Figures

ERASING HEAD

BACKGROUND OF THE INVENTION

1. Field of the Invention

The present invention relates to erasing heads and more particularly to erasing heads having a sufficiently high erasing effect and able to minimize the distortion ratio for recording.

2. Description of the Prior Art

Various types of erasing heads have been known and used in respect of record and reproduce apparatus. Among them, semi-double gap type erasing heads, in FIG. 1, and double gap type heads, as illustrated in FIG. 2, are most generally used. In FIG. 1, 1a is a ferrite core, 2a is a non-magnetic gap material element, 3 is a magnetic member of high permeability and 4a is a winding. In the structure illustrated in FIG. 2, 1b is a ferrite core, 2b is a nonmagnetic gap material element and 4b is a winding.

So far as the erasing ratio is concerned, these known erasing heads are all satisfactory for practical use except in the case of unsuitably designed ones. However, it has been found that they have a limitation in respect of reduction of the distortion ratio. When new information is recorded after erasing, it is impossible for these known erasing heads to reduce the distortion ratio of the recorded signals up to a desired level below a certain limit.

SUMMARY OF THE INVENTION

Accordingly, it is an object of the invention to provide an erasing head which has an erasing ratio high enough to completely erase information once recorded on the tape.

It is another object of the invention to provide an erasing head which permits a decrease in the distortion ratio thereby to improve the quality of information newly recorded on the tape.

A further object of the invention is to provide an erasing head in which an increased erasing ratio and a decreased distortion ratio are attainable at the same time with a very simple structure.

Other and further objects, features and advantages of the invention will appear more fully from the following description taken in connection with the accompanying drawings.

DESCRIPTION OF THE PREFERRED EMBODIMENT

In order to improve the performance of erasing heads, and in particular, to minimize the distortion ratio, we have conducted a large number of experiments on the known erasing heads. These experiments have led us to the discovery that a substantial reduction of distortion ratio can be attained by using a substantially smaller amount of erasing current than the nominal erasing current. In the experiments, various conventional erasing heads were used to erase information once recorded on a magnetic tape for re-recording. When information once recorded on the tape was erased by using nominal erasing current and new recording was carried out on the tape, the distortion ratio always remained at or above a certain level and no further reduction of distortion ratio beyond the limit was attainable. However, it has been found that when the information is erased by using a certain amount of erasing current, which is substantially smaller than the nominal one, for example, with such erasing current corresponding to only several tenths of the nominal current, the next recording on the tape is expected with a substantially reduced distortion ratio. In this manner, the amount of erasing current used has an effect on the distortion ratio for a succeeding recording on the erase tape.

Figure 1:
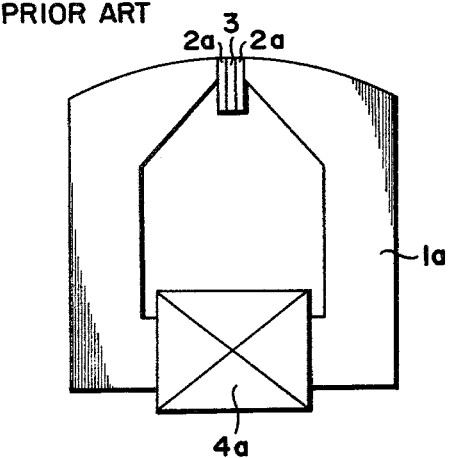
FIG. 1 shows, in schematic plan view, the structure of a semi-double gap type erasing head according to the prior art.
Figure 2:
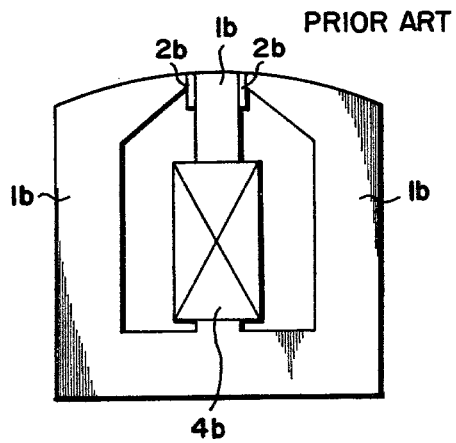
FIG. 2 is a similar view to FIG. 1 but shows the structure of a double gap type erasing head according to the prior art.
Figure 3:
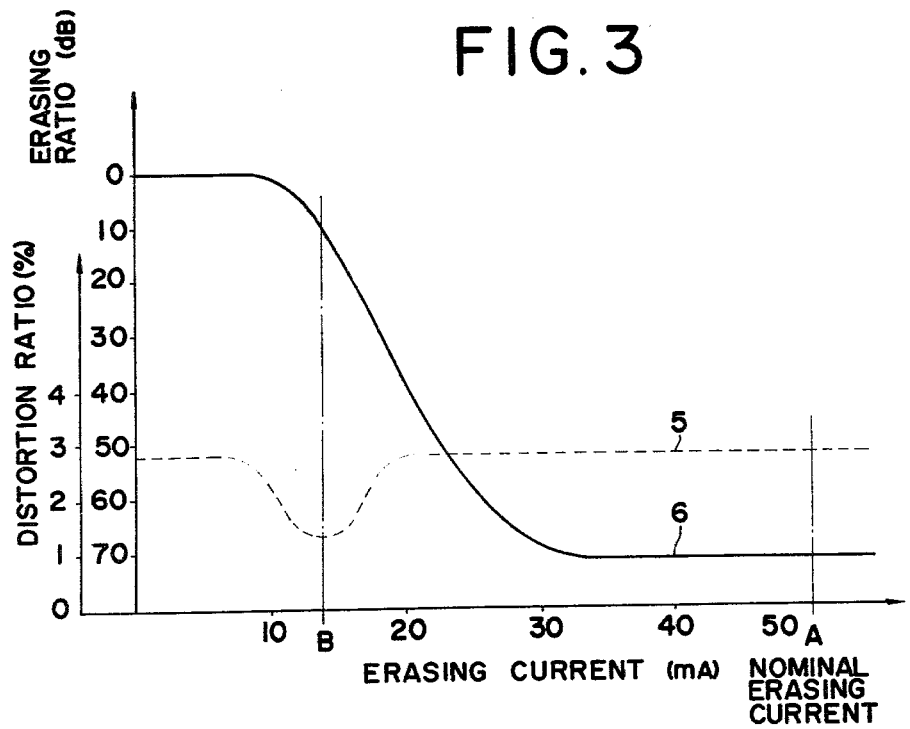
FIG. 3 shows relation curves of erasing current to erasing ratio or erasing current to distortion ratio.

One typical result of our experiments is given in FIG. 3. Broken line curve 5 in FIG. 3 shows the relation between erasing current and distortion ratio obtained when recording and reproducing were carried out with a conventional permalloy head after erasing a $\gamma Fe_2O_3$ tape of non-recorded condition using a conventional erasing head. Solid line curve 6 shows the relation between erasing current and erasing ratio obtained when erasing was carried out with the same erasing head. Measuring conditions used in the experiment were tape speed of 4.78 cm/s., signal frequency of 333 Hz, recording level of 160 pWb and erasing frequency of 150 KHz.

As seen from these relation curves, the conventional erasing head has such tendency that if the nominal erasing current is used to sufficiently effect erasing of the tape, then the distortion ratio becomes deteriorated (see Line A) and that on the contrary, if the erasing current is ajusted so as to minimize the distortion ratio, then an incomplete erasing results therefrom (see Line B). These two occurrences act contradictorily to each other for the purpose of improvement in performance of erasing head. The above described experiment was repeated changing tape and head variously. But, the same result was always obtained and all the known erasing heads have been found to have the same contradictive tendency.

The present invention is based upon the finding described above and summarized in FIG. 3 and makes it possible to solve the two contradictory problems, that is, increasing of erasing ratio and decreasing of distortion ratio at the same time in a satisfactory manner and with only a simple structure. According to the present invention, a substantial improvement in the performance of the erasing head can be attained by using plural gaps. At one gap part, there is applied an erasing magnetic field sufficiently high to completely erase information already recorded on a magnetic tape. With the other gap part there is applied a magnetic field of a level at which the distortion ratio of information for the succeeding recording may be minimized.

Figure 4A:
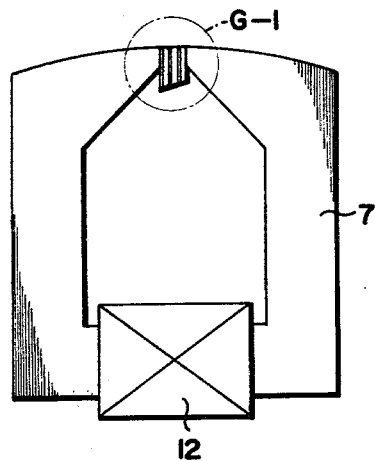
FIG. 4A schematically shows first and second embodiments of a semi-double gap type erasing head according to the invention.
Figure 4B:
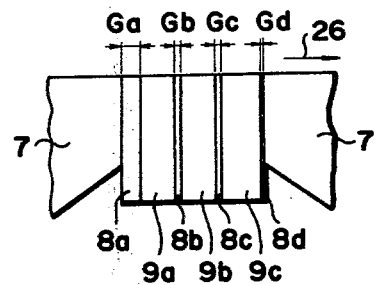
FIG. 4B is a partially enlarged view of the gap portion of the first embodiment shown in FIG. 4A.

Referring now to FIG. 4A there is shown an erasing head of the single magnetic circuit type (semi-double type) in which the present invention is embodied as the first and second embodiments. FIG. 4B is a partially enlarged view of the butting part G-1 enclosed with a circle in FIG. 4A and shows the first embodiment in detail.

Non-magnetic gap elements $8a$, $8b$, $8c$, $8d$ which are different in thickness from each other and magnetic gap elements $9a$, $9b$, $9c$ which are made of high permeability magnetic material constitute together the butting part G-1 having a tape sliding part on the surface. Core 7 is of the type similar to the conventional one and is made of high permeability material such as ferrite. Winding 12 is formed using a covered wire such as copper wire covered with polyurethane in the conventional manner.

Compared with the conventional erasing head, this embodiment is featured by the particular arrangement of gap elements. In this embodiment, effective gap widths Ga, Gb, Gc, Gd determined by the interposition of non-magnetic gap elements $8a$, $8b$, $8c$, $8d$ respectively are measured to satisfy the following condition:

> Ga>Gb>Gc>Gd Furthermore, in order to achieve a more efficient effect of the invention, the gap width Gd at the one end is so selected as to be less than ½ of the largest width Ga at the other end, that is,
>
> Ga>2 Gd.

A magnetic tap (not shown) is moved along the tape sliding surface in the direction of arrow 26.

In this embodiment, the number of gaps is more than 2. This makes it possible to accommodate the erasing head to various kinds of magnetic tapes such as $\gamma Fe_2O_3$ tape, $CrO_2$ tape and two-layer coating tape composed thereof. Also, it serves to make the erasing head adaptable to variation of heads and other changes (for example, change in output of the oscillator on the deck caused by change of source voltage) without any adjustment.

Shift of the optimum point due to the difference in the kind of tape then used may be adjusted in a simple manner, for example, by altering the erasing current using a tape changeover switch. At this time, the abutting part may be divided into two gaps, that is, a gap for erasing and a gap for distortion ratio adjustment.

Figure 4C:
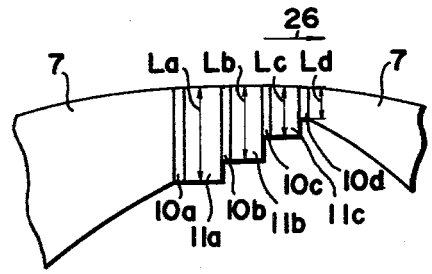
FIG. 4C is a partially enlarged view of the gap portion of the second embodiment shown in FIG. 4A.

FIG. 4C shows the second embodiment in detail. In this arrangement of the second embodiment, the butting part G-1 is composed of non-magnetic gap elements $10a$, $10b$, $10c$, $10d$ which are different in gap depth from each other and magnetic gap elements $11a$, $11b$, $11c$ made of high permeability magnetic material. Gap depths La, Lb, Lc, Ld hold the following conditional relation between them:

> La>Lb>Lc>Ld.

The number of gap elements may be increased as desired.

Figure 5A:
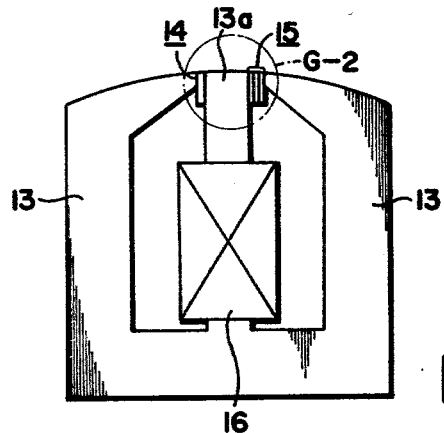
FIG. 5A schematically shows third and fourth embodiments of a double gap type erasing head according to the invention.

In FIG. 5A there is schematically shown a double gap type erasing head in which the present invention is embodied as the third and fourth embodiments.

In the known manner, a winding 16 is wound around a center core $13a$ constituting a part of the core 13 and gaps are provided for each of the two magnetic circuits. Butting part G-2 is composed of gap part 14 and gap part 15.

Figure 5B:
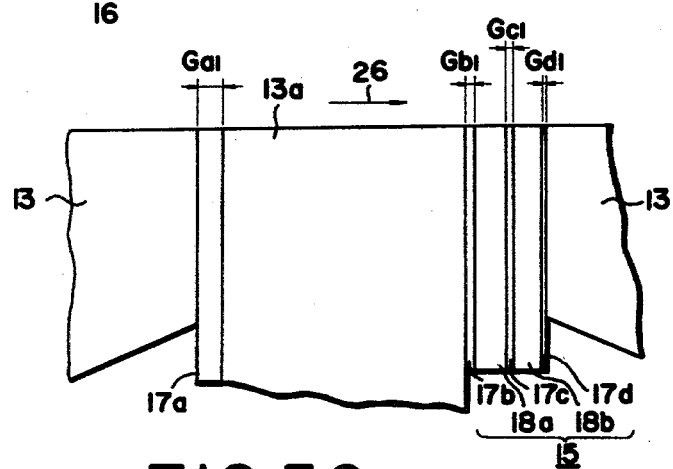
FIG. 5B is a partially enlarged view of the gap portion of the third embodiment shown in FIG. 5A.

The third embodiment is shown in detail FIG. 5B which is an enlarged view of the butting part G-2. In this embodiment, the butting part G-2 comprises non-magnetic gap elements $17a$ (in gap part 14), $17b$, $17c$, $17d$ (in gap part 15) and magnetic gap elements $18a$, $18b$ (in gap part 15) made of high permeability magnetic material. The butting part G-2 has a tape sliding portion on its upper surface. The core 13, $13a$ is of the type similar to the conventional one and made of high permeability material such as ferrite. 16 is a winding as mentioned above.

In this third embodiment, the arrangement of the gap part 15 is substantially the same as that of the first embodiment shown in FIG. 4B. Effective widths $Ga_1$, $Gb_1$, $Gc_1$, $Gd_1$ are measured so as to satisfy the following condition:

> $Ga_1 > Gb_1 > Gc_1 > Gd_1$. In addition, in order to attain a further improved effect, the largest gap width $Ga_1$ is so measured as to be approximately equal to the sum of the remaining gap widths $Gb_1 + Gc_1 + Gd_1$, that is:
>
> $Ga_1 \approx Gb_1 + Gc_1 + Gd_1$.

A magnetic tape (not shown) is moved along the tape sliding portion in the direction of arrow 26.

In the gap part 15, the gaps may be made different in gap depth from each other according to the second embodiment (La>Lb>Lc>Ld) shown in FIG. 4C.

Figure 5C:
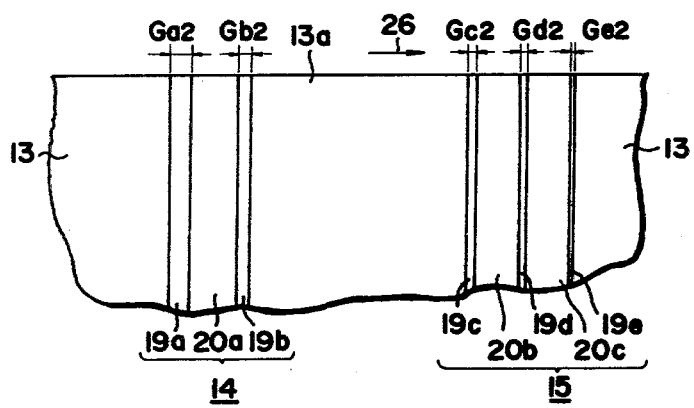
FIG. 5C is a partially enlarged view of the gap portion of the fourth embodiment shown in FIG. 5A.

FIG. 5C is an enlarged view of the butting part G-2 showing a fourth embodiment in detail. In this embodiment, the butting part G-2 comprises non-magnetic gap elements $19a$, $19b$ (in gap part 14), $19c$, $19d$, $19e$ (in gap part 15) and magnetic gap elements $20a$ (in gap part 14), $20b$, $20c$ (in gap part 15). The magnetic gap elements are again made of high permeability magnetic material. The non-magnetic elements $19a$–$19e$ are each of a different thickness. The arrangements of the gap parts 14 and 15 are similar to that of the first embodiment shown in FIG. 4B. Effective gap widths $Ga_2$, $Gb_2$, $Gc_2$, $Gd_2$, $Ge_2$ are so measured as to satisfy the following conditional relation:

> $Ga_2 > Gb_2 > Gc_2 > Gd_2 > Ge_2$.

Figure 6:
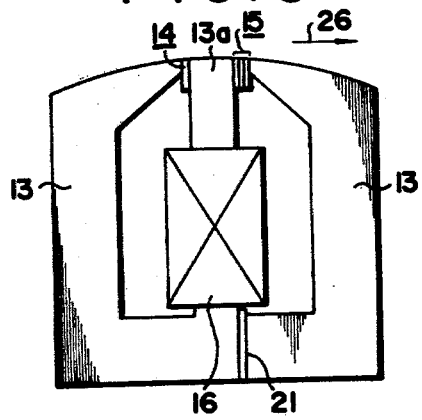
FIG. 6 schematically shows a fifth embodiment of the invention in which the erasing head shown in FIG. 5A is modified to have a non-magnetic spacer member provided at the backside of the head.

FIG. 6 schematically shows the fifth embodiment of the invention which is a modification of the embodiments described above with reference to FIGS. 5A–5C. The magnetic head shown in FIG. 6 is different from that shown in FIG. 5A in the point that an additional non-magnetic spacer 21 is inserted into a backside gap provided on the side opposite to the side of the tape sliding surface portion. According to this embodiment, the magnetic resistance in the magnetic circuit (that is a part formed by the core 13, $13a$) is adjusted and therefore the erasing magnetic field at the backside gap portion can be adjusted.

Figure 7:
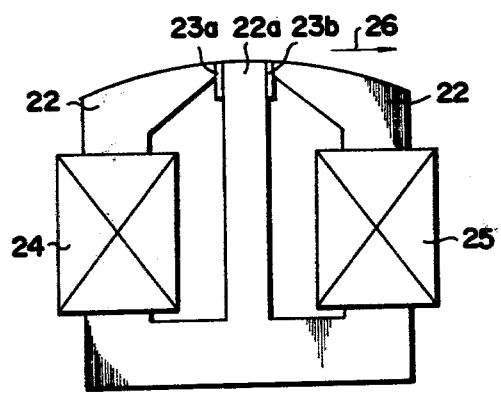
FIG. 7 schematically shows a sixth embodiment of the invention wherein in addition to the winding for erasing there is provided a winding for improving the distortion ratio.

FIG. 7 is a schematic view of a double gap type erasing head showing the sixth embodiment of the invention. In this embodiment, on a part of the core 22 there is provided a center core 22a to form two magnetic circuits with the interposition of two non-magnetic gap elements 23a and 23b therebetween and two separate windings are provided of which one designated by 24 is adapted for erasing and the other 25 is for improving distortion ratio. To the erasing winding 24 is applied the nominal erasing current A (see FIG. 3) and to the distortion ratio improving winding 25 there is applied a current B which is just enough to minimize the distortion ratio.

Employing any of these embodiments 1 through 6 a substantial increase of erasing ratio and a substantial decrease of distortion ratio can be attained when a magnetic tape is driven in the direction of arrow 26 along the tape sliding surface part of the erasing head. For embodying the present invention, the basic structure of the conventional erasing head can be used as such. It is required only to change the arrangement of the gap part. Therefore, the erasing head of the present invention is simple in structure and has very remarkable practical effects and advantages.

While the invention has been particularly shown and described with reference to preferred embodiments thereof, it will be understood by those skilled in the art that the foregoing and other changes in form and details can be made therein without departing from the spirit and scope of the invention.

What we claim is:

1. An erasing head comprising:
   a core of high permeability material and having spaced pole pieces;
   a coil wound on said core; and
   layers of non-magnetic and high permeability materials alternately disposed between said pole-pieces characterized in that said layers comprise:
   a first non-magnetic material being in contact with the upstream pole-piece and having thickness $Ga$;
   a second non-magnetic material disposed between high permeability materials one of which contacts with said first non-magnetic material, and having thickness $Gb$ less than $Ga$; and
   a third non-magnetic material being in contact with the downstream pole-piece and having thickness $Gd$ less than $Gb$ and less than $\frac{1}{2}Ga$.

2. An erasing head according to claim 1 wherein said non-magnetic materials satisfy the relationship in their thickness set forth below;

$$Ga = Gb + Gd.$$

3. An erasing head according to claim 1 wherein said layers further comprise a fourth non-magnetic material disposed between high permeability materials one of which contacts with said third non-magnetic material and another contacts with said second non-magnetic material, said fourth non-magnetic material having thickness $Gc$ which satisfies the relation set forth below;

$$Ga > Gb > Gc > Gd.$$

4. An erasing head according to claim 3 wherein said non-magnetic materials satisfy the relationship in their thickness set forth below;

$$Ga = Gb + Gc + Gd.$$

5. An erasing head comprising:
   a core of high permeability material and having spaced pole-pieces;
   a coil wound on said core; and
   layers of non-magnetic and high permeability materials alternately disposed between said pole-pieces;
   characterized in that the pole-pieces of said core are different from each other in depth, the upstream one having depth $La$, the downstream one having depth $Ld$ less than $La$, and said layers comprise;
   a first non-magnetic material in contact with the upstream pole-piece and having depth $La$ and a first high permeability material having depth $La$;
   a second non-magnetic material interposed between said first high permeability material and a second high permeability material having depth $Lb$ less than $La$; and
   a third non-magnetic material being in contact with the downstream pole-piece and having depth $Ld$ less than $Lb$ and less than $\frac{1}{2}La$.

6. An erasing head according to claim 5 wherein said high permeability materials satisfy the relationship in their depth set forth below;

$$La = Lb + Ld.$$

7. An erasing head according to claim 5 wherein said layers further comprise a fourth non-magnetic material interposed between said second high permeability material and a third high permeability material being in contact with said third non-magnetic material and having depth $Lc$ which satisfies the relation set forth below;

$$La > Lb > Lc > Ld.$$

8. An erasing head according to claim 7 wherein sad high permeability materials satisfy the relationship in their depth set forth below;

$$La = Lb + Lc + Ld.$$

9. An erasing head comprising:
   a core of high permeability material and having first, second, and third spaced pole-piece, said first pole-piece being the upstream pole and said third pole piece being the downstream pole;
   a coil wound on said core;
   a first non-magnetic material having thickness $Ga$ and being disposed between said first and second pole-pieces; and
   layers of non-magnetic and high permeability materials alternately disposed between said second and thid pole-pieces in such manner that a second non-magnetic material having thickness $Gb$ less than $Ga$ is in contact with said second pole-piece being common to one of said first pole-pieces, a third non-magnetic material having thickness $Gd$ less than $Gb$ is in contact with said third pole-piece, and at least one high permeability material is provided between said second and third non-magnetic materials.

10. A erasing head according to claim 9 wherein said non-magnetic materials satisfy the relation in their thickness set forth below;

$$Ga > Gb \geq \tfrac{1}{2}Ga > Gd.$$

11. An erasing head according to claim 10 wherein said non-magnetic materials satisfy the relation set forth below;

$$Ga \simeq Gb + Gd.$$

12. An erasing head according to claim 10 wherein said layers further a fourth non-magnetic material disposed between high permeability materials one of which contacts with said third non-magnetic material and another contacts with said second non-magnetic material, said fourth non-magnetic material having thickness Gc which satisfies the relation set forth below;

$$Ga > Gb > Gc > Gd.$$

13. An erasing head according to claim 12 wherein said non-magnetic materials satisfy the relationship in their thickness set forth below;

$$Ga \simeq Gb + Gc + Gd.$$

14. An erasing head comprising:
a core of high permeability material and having first, second, and third spaced pole-pieces, said first pole-piece being the upstream pole and said third pole piece being the downstream pole;
a coil wound on said core;
first layers on non-magnetic and high permeability materials alternately disposed between said first and second pole-pieces in such manner that a first non-magnetic material having thickness Ga is in contact with said first pole-piece, a second non-magnetic material having thickness Gb less than Ga is in contact with said second pole-piece which pole-piece, and a high permeability material is disposed between said first and second non-magnetic materials; and
second layers of non-magnetic and high permeability materials alternately disposed between said second and third pole-pieces in such manner that a third non-magnetic material having thickness Gc less than Gb is in contact with said second pole-piece, a fourth non-magnetic material having thickness Ge less than Gd is in contact with said third pole-piece, and at least one high permeability material is provided between said third and fourth non-magnetic materials.

15. An erasing head according to claim 14 wherein said non-magnetic materials satisfy the relation in their thickness set forth below;

$$Ga > Gb > Gc \geq \tfrac{1}{2}Ga > Ge.$$

16. An erasing head according to claim 15 wherein said non-magnetic materials satisfy the relation set forth below;

$$Ga \simeq Gb + Gc + Ge.$$

17. An erasing head according to claim 15 wherein said second layers further a fifth non-magnetic material disposed between high permeability materials one of which contacts with said third non-magnetic material and another contacts with said fourth non-magnetic material, said fifth non-magnetic material having thickness Gc which satisfies the relation set forth below;

$$Ga > Gb > Gc > Gd > Ge.$$

18. An erasing head accoding to claim 17 wherein said non-magnetic materials satisfy the relationship in their thickness set forth below;

$$Ga \simeq Gb + Gc + Gd + Ge.$$

19. An erasing head comprising:
a core of high permeability material and having first, second, and third spaced pole-pieces wherein said first pole-piece is the upstream pole and has depth La, and said third pole-piece is the downstream pole has depth Ld less than $\tfrac{1}{2}$La;
a coil wound on said core;
a first non-magnetic material disposed between said first and second pole-pieces; and
layers of non-magnetic and high permeability materials alternately disposed between said second and third pole-pieces in such manner that a second non-magnetic material contacts said second pole piece and a third high permeability material having depth Lb less than La, and a third non-magnetic material is in contact with said third pole-piece and having depth Ld less than Lb.

20. An erasing head according to claim 19 wherein said high permeability materials satisfy the relationship in their depth set forth below;

$$La \simeq Lb + Ld.$$

21. An erasing head according to claim 38 wherein said second layers further comprise a fourth non-magnetic material disposed between said first high permeability material and a secnd high permeability material being in contact with said third non-magnetic material and having depth Lc which satisfies the relation set forth below;

$$La > Lb > Lc > Ld.$$

22. An erasing head according to claim 21 wherein said high permeability materials satisfy the relationship in their depth set forth below;

$$La \simeq Lb + Lc + Ld.$$

23. An erasing head comprising:
a core of high permeability material and having first, second and third spaced pole-pieces forming two transducing gaps, said first pole-piece being the upstream pole and said third pole-piece being the downstream pole;
a coil wound on said core;
a first gap member of non-magnetic material having thickness Ga disposed in the transducing gap between said first and second pole-pieces;
a second gap member disposed in the transducing gap between said second and third pole-piece, said second gap member comprises layers of non-magnetic and high permeability materials alternately disposed between said second and third pole-pieces in such manner that a non-magnetic material having thickness Gb less than Ga is in contact with said second pole-piece, a non-magnetic material having thickness Gd less than Gb is in contact with said third pole-piece, and a high permeability material is dispfosed between said non-magnetic naterials; and a third gap member of non-magnetic material disposed in a back gap between said second and third pole-pieces.

24. A erasing head comprising:

a core of high permeability material and having a first pole-gap through which a first closed magnetic circuit is defined, and a second pole gap through which a second closed magnetic circuit is defined;

a first coil wound on said first closed magnetic circuit and first coil energizing means for producing a first magnetic field sufficient to erase the information on a magnetic tap passing near said first pole gap; and a second coil wound on said second closed magnetic circuit and second coil energizing means for producing a second magnetic field to decrease the distortion ratio for the magnetic tap passing near said second pole gap in such manner that said second magnetic field is more weak than said first magnetic field.

* * * * *

UNITED STATES PATENT AND TRADEMARK OFFICE
CERTIFICATE OF CORRECTION

PATENT NO. : 4,205,356
DATED : May 27, 1980
INVENTOR(S) : FUMIO TANAKA, et al.

It is certified that error appears in the above-identified patent and that said Letters Patent are hereby corrected as shown below:

Column 1, line 13, insert --as shown-- after "erasing heads,";

line 38, change "permite" to --permits--.

Column 2, line 36, change "expected" to --effected--.

Column 3, lines 35 to 40, change $Ga > Gb > Gc > Gd$ Furthermore, in order to achieve a more efficient effect of the invention, the gap width Gd at the one end is so selected as to be less than ½ of the largest width Ga at the other end, that is, $Ga > 2 Gd.$ to read as follows:

-- $Ga > Gb > Gc > Gd$

Furthermore, in order to achieve a more efficient effect of the invention, the gap width Gd at the one end is so selected as to be less than 1/2 of the largest width Ga at the other end, that is, $Ga > 2 Gd.$ --.

UNITED STATES PATENT AND TRADEMARK OFFICE
CERTIFICATE OF CORRECTION

PATENT NO. : 4,205,356
DATED : May 27, 1980
INVENTOR(S) : FUMIO TANAKA, et al.

It is certified that error appears in the above-identified patent and that said Letters Patent are hereby corrected as shown below:

Column 4, lines 28 to 33, change $Ga_1 > Gb_1 > Gc_1 > Gd_1$. In addition, in order to attain a further improved effect, the largest gap width $Ga_1$ is so measured as to be approximately equal to the sum of the remaining gap widths $Gb_1 + Gc_1 + Gd_1$, that is:

$$Ga_1 \approx Gb_1 + Gc_1 + Gd_1.$$

to read as follows:

-- $Ga_1 > Gb_1 > Gc_1 > Gd_1.$

In addition, in order to attain a further improved effect, the largest gap width $Ga_1$ is so measured as to be approximately equal to the sum of the remaining gap widths $Gb_1 + Gc_1 + Gd_1$, that is, $$Ga_1 \approx Gb_1 + Gc_1 + Gd_1. \text{ --}$$

UNITED STATES PATENT AND TRADEMARK OFFICE
CERTIFICATE OF CORRECTION

PATENT NO. : 4,205,356
DATED : May 27, 1980
INVENTOR(S) : FUMIO TANAKA, et al.

It is certified that error appears in the above-identified patent and that said Letters Patent are hereby corrected as shown below:

Column 6, lines 56-57, delete "being common to one of said first pole-pieces".

Column 7, line 8, after "further" insert --include--;

line 62, after "further" insert --include--.

Column 8, line 31, change "claim 38" to --claim 19--;

line 68, change "dispfosed" to --disposed--.

Column 10, line 2, change "tap" to --tape--;

line 6, change "tap" to --tape--.

Signed and Sealed this

Fourth Day of November 1980

[SEAL]

Attest:

SIDNEY A. DIAMOND

Attesting Officer

Commissioner of Patents and Trademarks